United States Patent
Griggs, Jr. et al.

(10) Patent No.: US 6,802,550 B1
(45) Date of Patent: Oct. 12, 2004

(54) EMERGENCY LOCKING CONSOLE ASSEMBLY

(75) Inventors: Lawrence H. Griggs, Jr., Macomb, MI (US); Joseph J. Davis, Jr., Ortonville, MI (US)

(73) Assignee: Lear Corporation, Southfield, MI (US)

(*) Notice: Subject to any disclaimer, the term of this patent is extended or adjusted under 35 U.S.C. 154(b) by 0 days.

(21) Appl. No.: 10/248,316

(22) Filed: Jan. 8, 2003

(51) Int. Cl.[7] .............................. B60R 11/06; B60R 7/04
(52) U.S. Cl. .................. 296/24.34; 296/37.8; 292/136; 292/DIG. 22
(58) Field of Search .............................. 296/37.1, 37.8, 296/24.3, 24.34, 24.1; 292/DIG. 22, 130, 136; 224/275

(56) References Cited

U.S. PATENT DOCUMENTS

| | | | |
|---|---|---|---|
| 3,990,531 A | * | 11/1976 | Register ..................... 180/281 |
| 4,106,829 A | * | 8/1978 | Dolle et al. .............. 312/235.8 |
| 4,402,547 A | * | 9/1983 | Weston et al. ......... 297/378.11 |
| 4,545,213 A | * | 10/1985 | Fujiwara et al. .............. 62/440 |
| 4,552,399 A | * | 11/1985 | Atarashi .................. 296/37.12 |
| 4,739,896 A | * | 4/1988 | Moss ......................... 52/169.6 |
| 4,925,072 A | | 5/1990 | Masler et al. |
| 4,988,134 A | * | 1/1991 | Vidwans et al. ............ 292/198 |
| 5,212,849 A | | 5/1993 | Aihara |
| 5,427,447 A | | 6/1995 | Satoh |
| 5,518,282 A | | 5/1996 | Sawada |
| 5,603,540 A | | 2/1997 | Shibao |
| 5,769,471 A | * | 6/1998 | Suzuki et al. ............ 292/336.3 |
| 2001/0045750 A1 | | 11/2001 | Ji et al. |
| 2002/0017791 A1 | | 2/2002 | Ji et al. |
| 2002/0089203 A1 | | 7/2002 | Flowerday et al. |
| 2003/0057709 A1 | * | 3/2003 | Hupfer .......................... 292/5 |

FOREIGN PATENT DOCUMENTS

| | | |
|---|---|---|
| DE | 41 30 847 A1 | 3/1993 |
| EP | 0 525 811 A1 | 2/1993 |
| EP | 0 561 332 A1 | 9/1993 |

* cited by examiner

*Primary Examiner*—D. Glenn Dayoan
*Assistant Examiner*—H. Gutman
(74) *Attorney, Agent, or Firm*—Bill Panagos, Esq.

(57) ABSTRACT

An emergency locking console assembly (10) for automatically locking in a closed position during a vehicular collision is provided. The assembly (10) includes an open-topped container (18) that is coupled to a vehicle (12). This container (18) has a lid (20) couple thereto for enclosing various items within the assembly (10). In addition, the assembly (10) includes an inertia actuated locking mechanism (34) coupled to the container (18) for the purpose of automatically engaging the lid (20) and locking the assembly (10) in a closed position during a vehicular collision.

16 Claims, 6 Drawing Sheets

EMERGENCY LOCKING CONSOLE ASSEMBLY

TECHNICAL FIELD

The present invention relates generally to console assemblies for automotive vehicles, and more particularly to an emergency locking console assembly with an inertia actuated locking mechanism for locking the console assembly in a closed position during a vehicular collision.

BACKGROUND OF THE INVENTION

Automotive manufacturers are well known for producing vehicles that have console assemblies, which are usually positioned between the driver seat and the passenger seat.

A typical console assembly includes an opened-topped container and a lid that is pivotally coupled to the container. These containers are intended to store a variety of objects, e.g. coins, pens, cellular phones, and pagers. Additionally, the lid is intended to engage the open-topped container for the purpose of selectively enclosing those objects within the container. This engagement between the lid and the open-topped container typically is accomplished by a resilient fastener, e.g. a spring-loaded latch, or various other fasteners.

A drawback of these console assemblies is that the fasteners can fail to secure the console assembly in a closed position during a vehicular collision. Specifically, the impact of a collision may jar the fasteners loose and cause them to disengage each other. As a result, the lid may inadvertently swing open and the contents of the container may exit the container. With specific regard to high speed collisions, these contents may become airborne projectiles that can harm the occupants of the vehicle. Moreover, in low speed collisions, the contents may scatter throughout the interior of the vehicle. Such results clearly are disadvantageous.

Therefore, it would be desirable to provide a console assembly that remains in a closed position during a vehicular collision so as to prevent its contents from inadvertently exiting the console assembly.

SUMMARY OF THE INVENTION

The present invention provides an emergency locking console assembly that automatically locks in a closed position during a vehicular collision. The assembly includes an open-topped container for attachment to a vehicle. This container has a lid coupled thereto for enclosing various items within the assembly. In addition, the assembly includes an inertia actuated locking mechanism that is coupled to the container for the purpose of automatically engaging the lid and locking the assembly in a closed position during a vehicular collision.

One advantage of the present invention is that an emergency locking console assembly is provided that automatically secures items within the assembly during a vehicular collision.

Another advantage of the present invention is that an emergency locking console assembly is provided that can decrease the likelihood of injury typically caused by unsecured items that may become airborne during a vehicular collision.

Still another advantage of the present invention is that an emergency locking console assembly is provided that can decrease the likelihood of items being scattered throughout the interior of a vehicle during sudden stops or vehicular collisions.

Other advantages of the present invention will become apparent when viewed in light of the detailed description of the preferred embodiment when taken in conjunction with the attached drawings and appended claims.

BRIEF DESCRIPTION OF THE DRAWINGS

For a more complete understanding of this invention, reference should now be made to the embodiments illustrated in greater detail in the accompanying drawings and described below by way of examples of the invention.

DETAILED DESCRIPTION OF THE INVENTION

Figure 1:
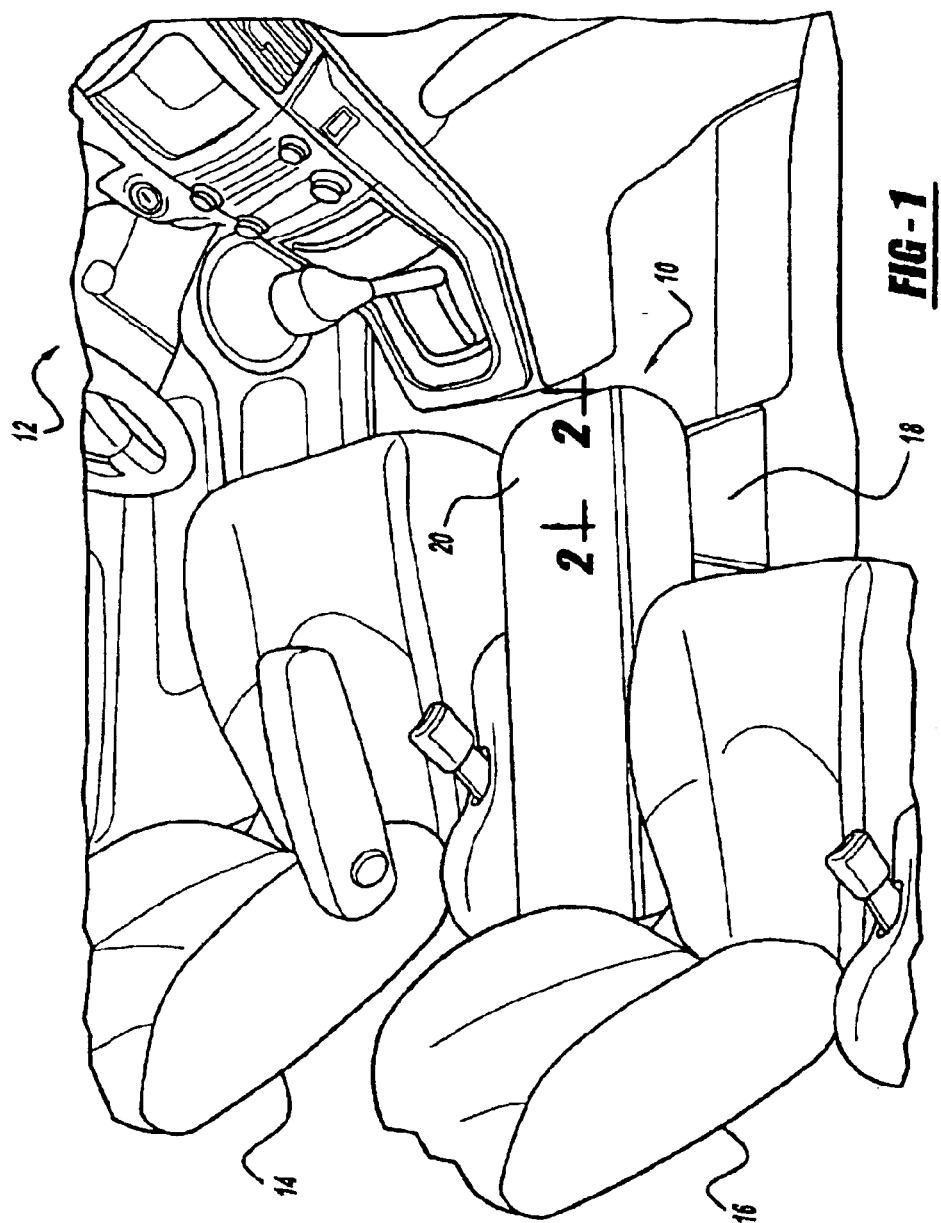
FIG. 1 is a perspective view of an emergency locking console assembly positioned within a vehicle between a passenger seat and a driver seat, according to one embodiment of the present invention.

In the following figures, the same reference numerals are used to identify the same components in the various views.

Referring to FIG. 1, there is shown an emergency locking console assembly 10 (hereinafter referred to as "console assembly"), in accordance with one embodiment of the invention. This console assembly 10 is attached to a vehicle 12 between a driver seat 14 and a passenger seat 16. However, it is understood that the console assembly 10 may be oriented in other suitable positions or otherwise attached to other suitable portions of the vehicle 12 as desired.

The console assembly 10 is comprised of an open-topped container 18 and a lid 20 that is pivotally coupled to the open-topped container 18. Specifically, a rear portion of this lid 20 and a rear portion of the open-topped container 18 are pivotally coupled to each other by a conventional hinge element (not shown) or various other pivotal couplings. It also understood, however, that the respective side portions or front portions of the lid 20 and the open-topped container 18 may be pivotally coupled to each other as desired. This pivotal coupling allows the lid 20 to swing open and closed thereby permitting an individual to store items within the console assembly 10.

Figure 2:
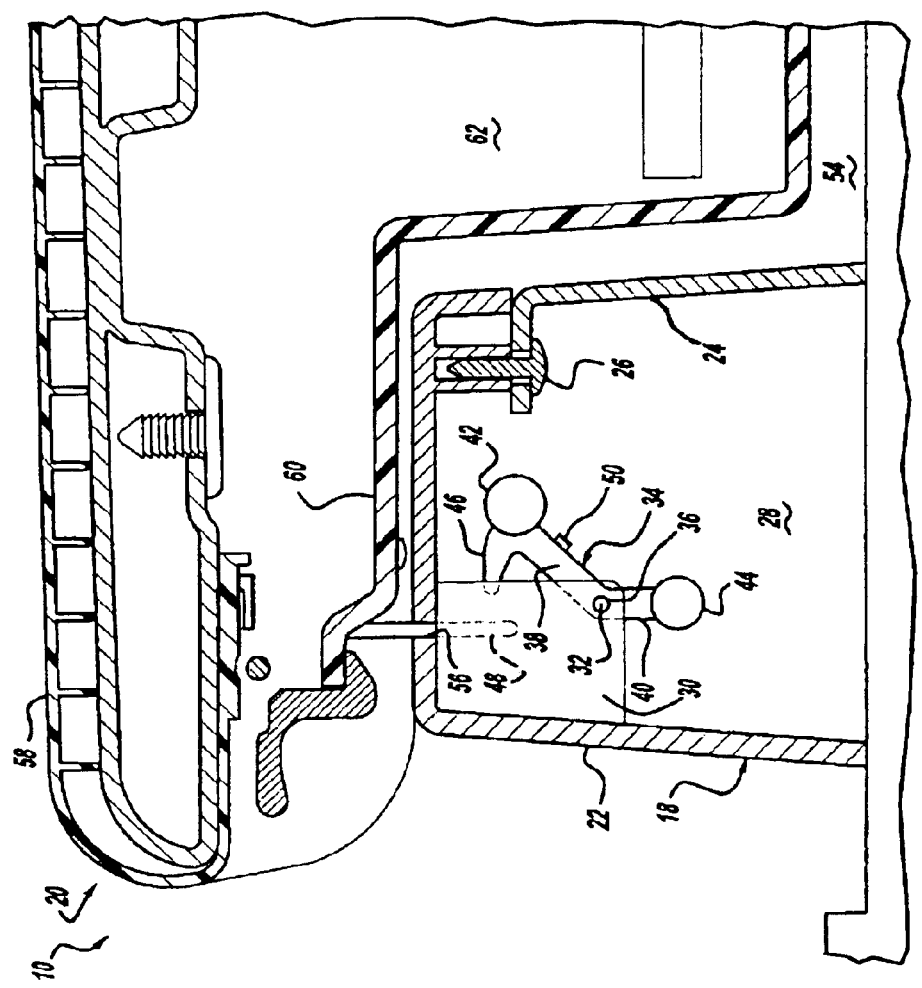
FIG. 2 is a partially cutaway view of the emergency locking console assembly shown in FIG. 1, as taken along line 2—2, illustrating an inertia actuated locking mechanism of the assembly in an unlocked position.
Figure 3:
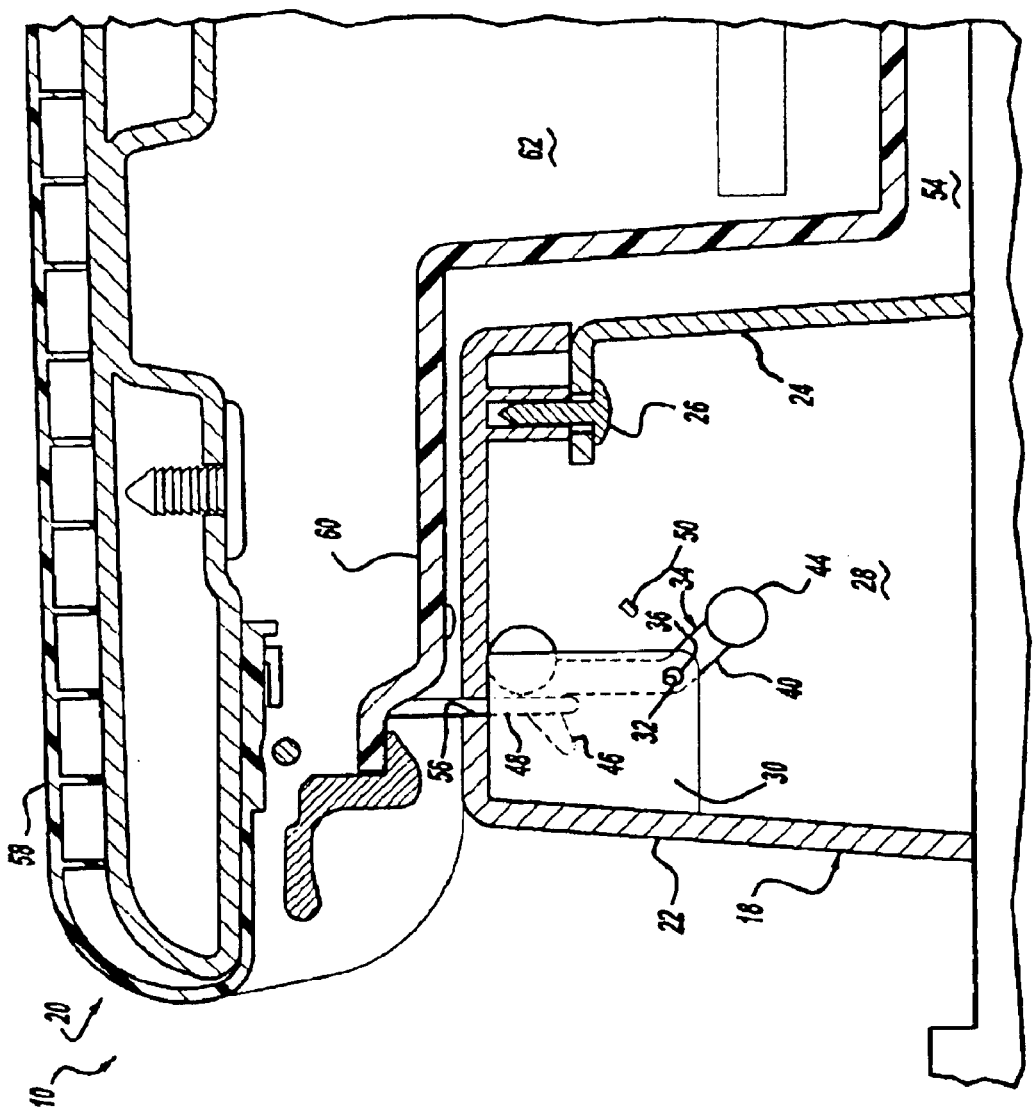
FIG. 3 is a partially cutaway view of the emergency locking console assembly shown in FIG. 2, illustrating the inertia actuated locking mechanism of the assembly in a locked position.

Referring now to FIGS. 2 and 3, there are shown cross-sectional views of a front portion of the console assembly 10 shown in FIG. 1. In particular, FIG. 2 shows the console assembly 10 in an unlocked position during normal operation of the vehicle 12. FIG. 3 shows the console assembly 10 in a locked position during a vehicular collision.

The open-topped container 18 includes an outer housing 22 and an inner housing 24 attached to the outer housing 22 by way of one or more screw fasteners 26 or other suitable fasteners as desired. These housings 22, 24 form a bin 54 in which various items, e.g. cellular phones, can be stored. The outer housing 22 and the inner housing 24 are plastic injection molded constructions. However, it is understood that these housings 22, 24 may be comprised of various other materials as desired.

Furthermore, the outer housing 22 and the inner housing 24 define a wall cavity 28. The outer housing 22 has a pair of tabs 30 extending therefrom into this wall cavity 28. These tabs 30 each have one or more openings 32 for receiving an inertia actuated locking mechanism 34 and for pivotally coupling the locking mechanism 34 to the open-topped container 18.

Figure 4:
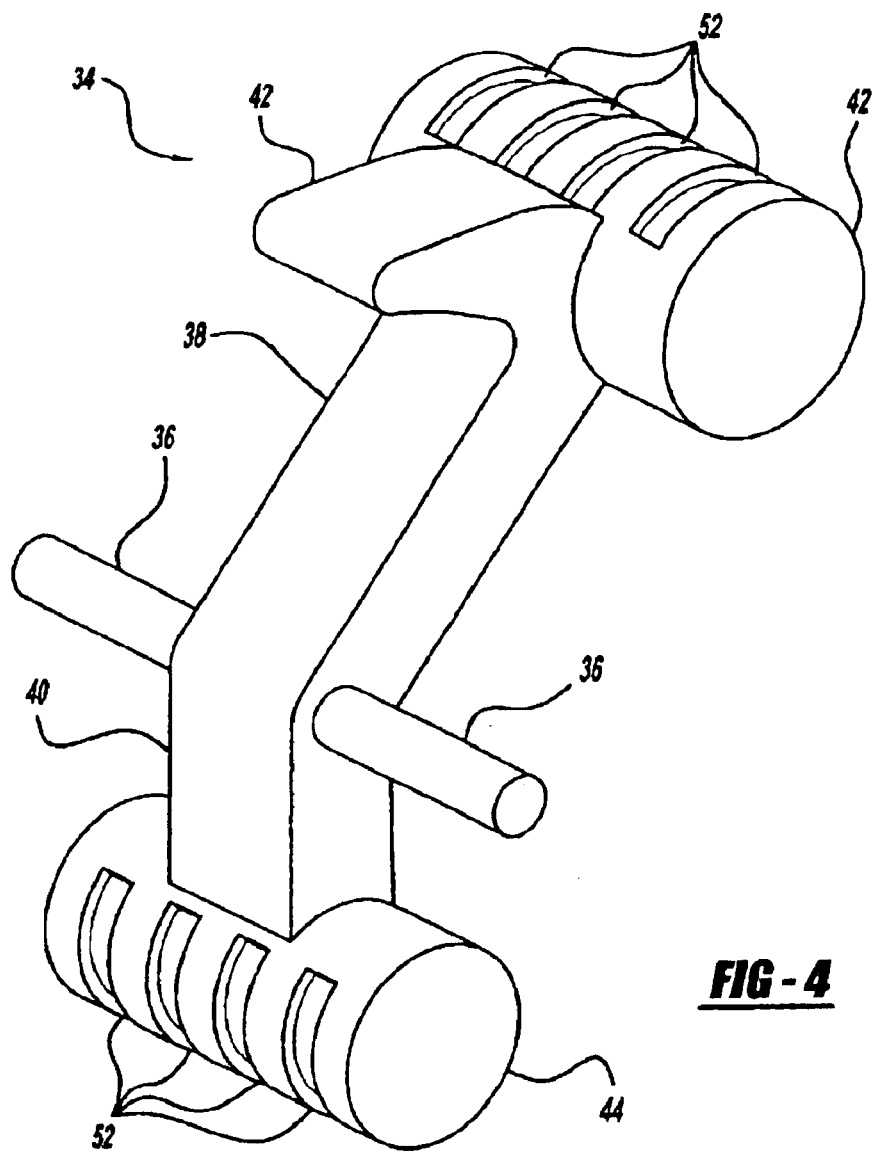
FIG. 4 is a perspective view of an inertia actuated locking mechanism according to one embodiment of the present invention.

As best shown in FIG. 4, the inertia actuated locking mechanism 34 includes a pair of pivot members 36 for insertion into the openings 32 of the tabs 30 and pivotally coupling the locking mechanism 34 to the open-topped container 18. This locking mechanism 34 is a one-piece plastic injection molded construction. However, it is understood that the locking mechanism 34 may be comprised of separate pieces and may be comprised of various types of materials as desired.

These pivot members 36 have a first arm 38 and a second arm 40 extending therefrom with a first counterweight 42 and a second counterweight 44 respectively coupled thereto. Furthermore, the first arm 38 includes a hook fastener 46 extending therefrom. This hook fastener 46 is intended to automatically engage a loop fastener 48 extending from the lid 20 for the purpose of securing the console assembly in a locked position during a vehicular collision. Specifically, the loop fastener 48 extends from a bottom portion of the lid 20 through an aperture 56 formed within the outer housing 22 and into the wall cavity 28. However, it is understood that the aperture 56 may instead be formed within the inner housing 24 as desired.

Both counterweights 42, 44 each have a predetermined mass and a predetermined position relative to the pivot members 36. These masses and positions collectively create a net moment about the pivot members 36 thereby causing the locking mechanism 34 to automatically move to either the unlocked position during normal operation of the vehicle (as shown in FIG. 2) or to the locked position during a vehicular collision (as shown in FIG. 3).

During normal operation of the vehicle 12, the primary acceleration experienced by the counterweight members 42, 44 is gravity. In this respect, the masses and the positions of the counterweight members 42, 44 are sufficient for allowing gravity and other nominal forces to create a net moment which pivots the locking mechanism 34 to the unlocked position.

During a vehicular collision, the counterweight members 42, 44 are subjected to substantial deceleration or acceleration, other than gravity. In this regard, the masses and the positions of the counterweight members 42, 44 are sufficient for allowing the net acceleration to create a net moment which pivots the locking mechanism 34 to a locked position. In other words, the net moment causes the hook fastener 46 to engage the loop fastener 48 of the lid 20 thereby locking the lid 20 to the open-topped container 18. As a result, items contained within the bin 54 are secured within the console assembly 10.

Figure 5:
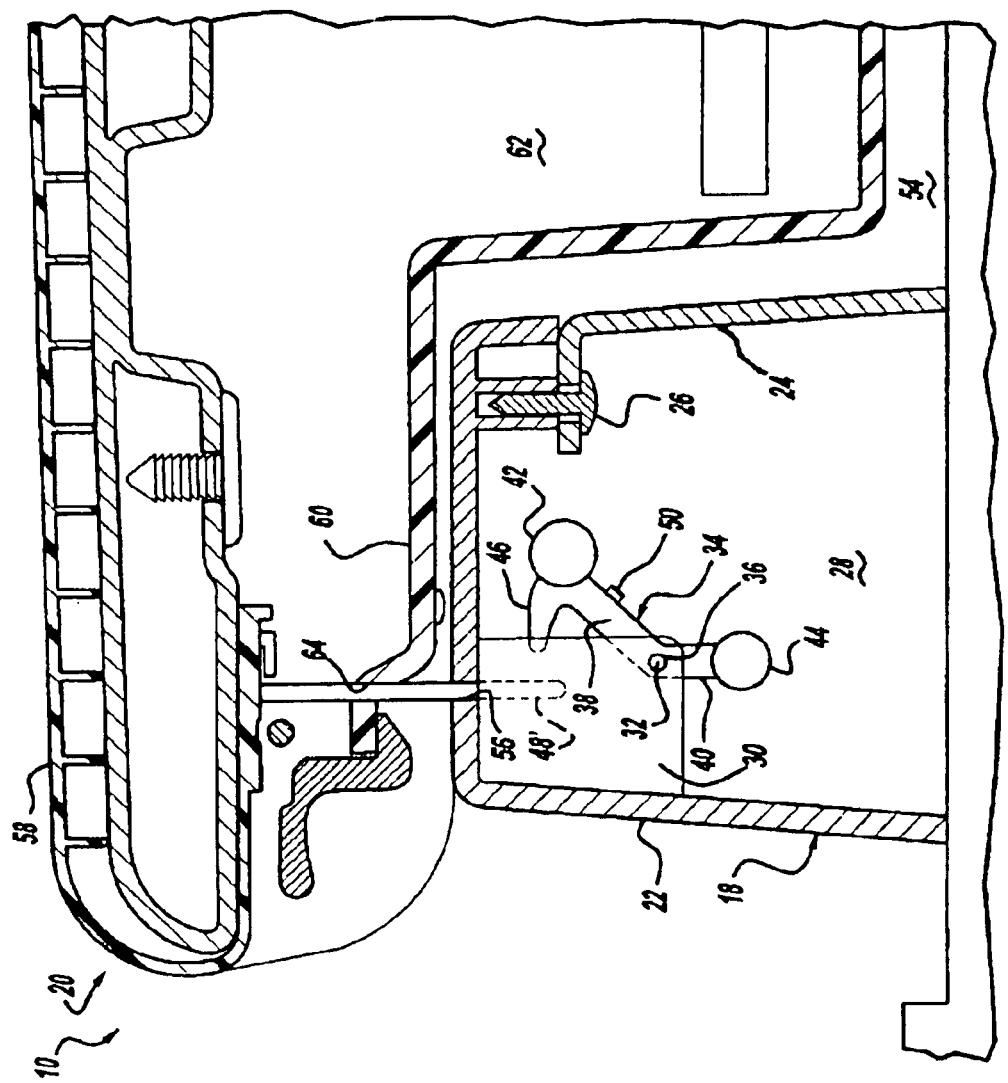
FIG. 5 is a partially cutaway view of the emergency locking console assembly, illustrating an inertia actuated locking mechanism of the assembly in an unlocked position, according to another embodiment of the invention.
Figure 6:
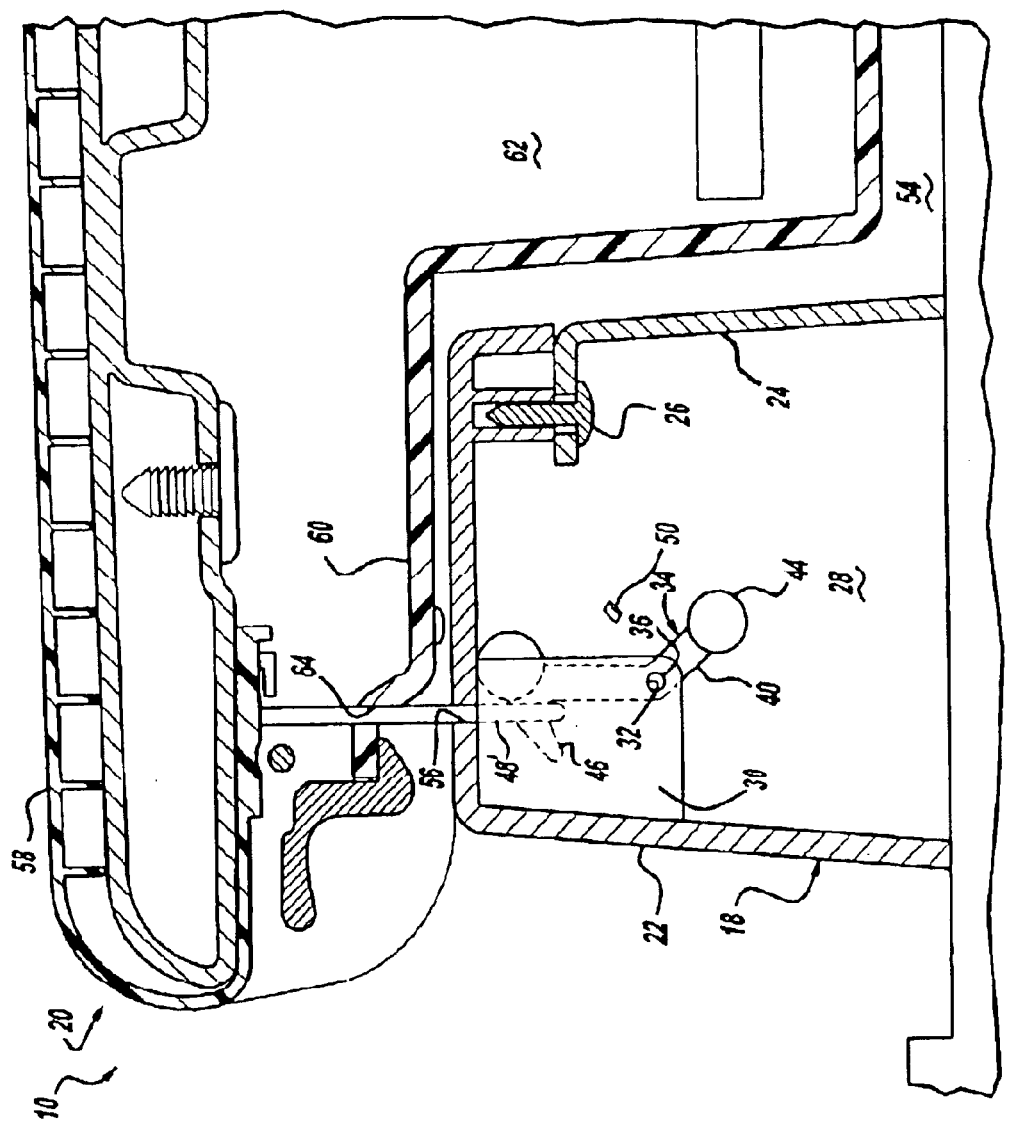
FIG. 6 is a partially cutaway view of the emergency locking console assembly shown in FIG. 5, illustrating the inertia actuated locking mechanism of the assembly in a locked position.

Referring now to FIGS. 5 and 6, according to another embodiment, the inertia actuated locking mechanism 34 can be utilized for securing smaller sized items that are stored within the lid 20. In particular, the lid 20 is comprised of an upper lid portion 58 and a lower lid portion 60 that is selectively coupled to the upper lid portion 58. Both lid portions are pivotally coupled to the open-topped container 18 as described above. The lower lid portion defines a receptacle 62 for storing smaller sized items therein. One or more resilient fasteners selectively engage the upper lid portion 58 to the lower lid portion 60 so as to enclose the contents of the receptacle 62.

This upper lid portion 58 has a loop fastener 48' extending therefrom. The loop fastener is in mold mounted to the upper lid portion 58. However, the loop fastener 48' may be attached to the upper lid portion 58 by a screw fastener or various other suitable fasteners. This loop fastener 48' is intended to extend through an opening 64 formed in the lower lid portion 60 and through the aperture 56 formed in the open-topped container 18. In this regard, when both the receptacle 62 and the bin 54 are placed in closed positions, the loop fastener 48' extends into the wall cavity 28 of the open-topped container 18 thereby allowing the locking mechanism 34 to automatically lock both the receptacle 62 and the bin 54 in the closed position.

Another feature of the invention is that the open-topped container 18 may include a detent member 50 which prevents the locking mechanism 34 from pivoting farther rearward from the loop fastener 48'. This detent member 50 is beneficial for preventing the locking mechanism 34 from pivoting to a position which can adversely affect the performance of the locking mechanism 34 during a collision. For example, the detent member 50 can prevent the inertia actuated locking mechanism 34 from pivoting so far rearward that the positions of the counterweights 42, 44 do not create a net moment that moves the locking mechanism 34 to a locked position during a vehicular collision.

While particular embodiments of the invention have been shown and described, numerous variations and alternate embodiments will occur to those skilled in the art. Accordingly, it is intended that the invention be limited only in terms of the appended claims.

What is claimed is:

1. An emergency locking console assembly for securing a plurality of items within the assembly during a vehicular collision, comprising:

an open-topped container coupled to a vehicle, said open-topped container defining a bin for storing the plurality of items;

a lid coupled to said open-topped container, said lid having a first fastener extending therefrom; and an inertia actuated locking mechanism pivotally coupled to said open-topped container and having a second fastener extending therefrom;

wherein said inertia actuated locking mechanism is automatically moveable between an unlocked position during normal vehicle operation and a locked position during the vehicular collision, said second fastener intended to engage said first fastener when said inertia actuated locking mechanism is in said locked position and disengage said first fastener when said inertia actuated locking mechanism is in said unlocked position;

wherein said inertia actuated locking mechanism includes at least one pivot member for pivotally coupling said inertia actuated locking mechanism to said open-topped container and a first counterweight coupled to said at least one pivot member, said first counterweight being positioned adjacent to said second fastener for causing said second fastener to engage said first fastener in said locked position during the vehicular collision.

2. The emergency locking console assembly of claim 1 wherein said inertia actuated locking mechanism further comprises:
   a second counterweight coupled to said at least one pivot member and positioned distal to said first counterweight, said second counterweight intended to pivot said inertia actuated locking mechanism and cause said second fastener to disengage said first fastener in said unlocked position during normal vehicle operation.

3. The emergency locking console assembly of claim 2 wherein said first counterweight has a first predetermined mass and is located in a first predetermined position relative to said at least one pivot member, said first predetermined mass and said first predetermined position intended to produce a first moment about said at least one pivot member.

4. The emergency locking console assembly of claim 3 wherein said second counterweight has a second predetermined mass and a second predetermined position relative to said at least one pivot member, said second predetermined mass and said second predetermined position intended to produce a second moment about said at least one pivot member;
   wherein said second moment overpowers said first moment during normal vehicle operation so as to move said inertia actuated locking mechanism to said unlocked position, said first moment overpowers said second moment during the vehicular collision so as to move said inertia actuated locking mechanism to said locked position.

5. The emergency locking console assembly of claim 2 wherein said inertia actuated locking mechanism is a one-piece injection molded body.

6. The emergency locking console assembly of claim 5 wherein said first counterweight and said second counterweight each have a plurality of slots formed therein for allowing said first counterweight and said second counterweight to cure evenly.

7. An emergency locking console assembly for securing a plurality of items within the assembly during a vehicular collision, comprising:
   an open-topped container coupled to a vehicle, said open-topped container defining a bin for storing the plurality of items;
   a lid coupled to said open-topped container, said lid having a loop fastener extending therefrom;
   an inertia actuated locking mechanism pivotally coupled to said open-topped container and having a hook fastener extending therefrom; and
   a detent member extending from said open-topped container and intended to prevent said inertia actuated locking mechanism from pivoting beyond a predetermined position;
   wherein said inertia actuated locking mechanism is automatically moveable between a locked position during the vehicular collision and an unlocked position during normal vehicle operation, said hook fastener intended to engage said loop fastener when said inertia actuated locking mechanism is in said locked position and disengage said loop fastener when said inertia actuated locking mechanism is in said unlocked position;
   wherein said open-topped container includes an inner housing and an outer housing coupled to said inner housing, said open-topped container defining a wall cavity between said inner housing and said outer housing, said inertia actuated locking mechanism being disposed within said wall cavity.

8. The emergency locking console assembly of claim 7 wherein said outer housing has a pair of tabs extending into said wall cavity, each of said pair of tabs having a hole formed therein for receiving said inertia actuated locking mechanism.

9. The emergency locking console assembly of claim 8 wherein said inertia actuated locking mechanism comprises:
   a pair of pivot members for insertion into each of said holes formed in said pair of tabs, said pair of pivot members for pivotally coupling said inertia actuated locking mechanism to said open-topped container.

10. The emergency locking console assembly of claim 9 wherein said inertia actuated locking mechanism further comprises:
    a first counterweight coupled to said at least one pivot member and positioned adjacent to said hook fastener, said first counterweight intended to cause said hook fastener to engage said loop fastener in said locked position during the vehicular collision.

11. The emergency locking console assembly of claim 10 wherein said inertia actuated locking mechanism further comprises:
    a second counterweight coupled to said at least one pivot member and positioned distal to said first counterweight, said second counterweight intended to pivot said inertia actuated locking mechanism and cause said hook fastener to disengage said loop fastener in said unlocked position during normal vehicle operation.

12. The emergency locking console assembly of claim 11 wherein said first counterweight has a first predetermined mass and is located in a first predetermined position relative to said at least one pivot member, said first predetermined mass and said first predetermined position intended to produce a first moment about said at least one pivot member.

13. The emergency locking console assembly of claim 12 wherein said second counterweight has a second predetermined mass and a second predetermined position relative to said at least one pivot member, said second predetermined mass and said second predetermined position intended to produce a second moment about said at least one pivot member;
    wherein said second moment overpowers said first moment during normal vehicle operation so as to move said inertia actuated locking mechanism to said unlocked position, said first moment overpowers said second moment during the vehicular collision so as to move said inertia actuated locking mechanism to said locked position.

14. The emergency locking console assembly of claim 13 wherein said lid comprises:
    a lower lid portion pivotally coupled to said open-topped container and defining a receptacle for storing the plurality of items; and
    an upper lid portion pivotally coupled to said open-topped container and said lower lid portion so as to enclose the plurality of items within said receptacle, said loop fastener extending from said upper lid portion.

15. The emergency locking console assembly of claim 14 wherein said lower lid portion defines an opening for passing said loop fastener therethrough.

16. The emergency locking console assembly of claim 15 wherein at least one of said inner housing and said outer housing defines an aperture for allowing said loop fastener to pass therethrough into said wall cavity.

* * * * *